United States Patent [19]

d'Alayer de Costemore d'Arc et al.

[11] E Re. 30,939

[45] Reissued May 18, 1982

[54] TRANSFER OF A FLEXIBLE WEB MEMBER FROM SUPPLY REEL TO A TAKE-UP REEL

[75] Inventors: Stephane M. d'Alayer de Costemore d'Arc; John L. Hiley, both of Brussels, Belgium

[73] Assignee: Staar S.A., Brussels, Belgium

[21] Appl. No.: 117,371

[22] Filed: Jan. 31, 1980

Related U.S. Patent Documents

Reissue of:

[64] Patent No.: 4,172,231
Issued: Oct. 23, 1979
Appl. No.: 810,276
Filed: Jun. 27, 1977

[30] Foreign Application Priority Data

Jul. 5, 1976 [FR] France ..... 76 20499
May 31, 1977 [FR] France ..... 77 16597

[51] Int. Cl.[3] ..... B65H 59/38; B65H 77/00; H02P 5/46; H02P 7/68

[52] U.S. Cl. ..... 318/7; 360/72.3; 242/75.51; 242/75.52; 242/191

[58] Field of Search ..... 318/6, 7; 242/75.51, 242/75.52, 186, 191; 360/72.1, 72.2, 72.3, 74.1, 74.2, 74.3, 74.4, 74.5, 74.6, 74.7, 73

[56] References Cited

U.S. PATENT DOCUMENTS

| | | | |
|---|---|---|---|
| 2,611,550 | 9/1952 | Nygaard | 242/54 |
| 3,564,219 | 2/1971 | Mutziger | 235/92 |
| 3,714,382 | 1/1973 | Sykes | 360/72.2 |
| 3,733,529 | 5/1973 | Ross et al. | 318/7 |
| 3,736,565 | 5/1973 | Sidline | 360/72.2 |
| 3,834,648 | 9/1974 | Rose et al. | 242/186 |

FOREIGN PATENT DOCUMENTS

| | | | |
|---|---|---|---|
| 2008494 | 9/1971 | Fed. Rep. of Germany . | |
| 2259497 | 6/1974 | Fed. Rep. of Germany . | |
| 2425856 | 12/1975 | Fed. Rep. of Germany | 242/191 |
| 50-92717 | 7/1975 | Japan . | |

*Primary Examiner*—J. V. Truhe
*Assistant Examiner*—Eugene S. Indyk
*Attorney, Agent, or Firm*—Leydig, Voit, Osann, Mayer and Holt

[57] ABSTRACT

A method for controlling the transfer of a flexible web member from a supply reel to a take-up reel, according to which the rotational speeds of the supply reel and the take-up reel are measured and whereby the ratio between these measurements is established independently of the speed and direction of the movement of the web member. The method comprises the steps of storing reference information representing the characteristics of different types of reel and web, releasing the reference information corresponding to the reels and webs used, generating intermediate signals which represent the said ratio combining these intermediate signals with the released reference information and generating output signals in dependence upon the momentary position of the web in relation to one or other ends thereof, and using these output signals for the purpose of visually displaying the position of the web and/or of controlling certain operations of the apparatus. Apparatus is also disclosed comprising angular speed detectors for measuring the rotational speed of each of the reels, and a micro-processor having two counters totalizing the pulse signals generated by the speed detectors and a divider circuit for generating, on receiving a control signal, intermediate signal representing the ratio between the contents of the counters, a memory containing reference information relating to different types of reels and web, and a circuit for combining the intermediate signals with the stored information corresponding to the reels and web used and generating output signals in dependence upon the instantaneous position of the web in relation to one or other of its ends. The output signals are applied to a display device serving to indicate the position of the web member.

31 Claims, 9 Drawing Figures

TRANSFER OF A FLEXIBLE WEB MEMBER FROM SUPPLY REEL TO A TAKE-UP REEL

Matter enclosed in heavy brackets [ ] appears in the original patent but forms no part of this reissue specification; matter printed in italics indicates the additions made by reissue.

The present invention relates to a method for controlling the transfer of a flexible web member from a supply reel to a take-up reel, according to which the rotational speeds of the supply reel and the takeup reel are measured and whereby the ratio between these measurements is established independently of the speed and direction of the movement of the web member. The invention also relates to an apparatus for the performance of this method.

Although not confined thereto, the invention relates more particularly to a position indicator for a magnetic tape in a recording and playback apparatus, in conjunction with the automatic control of certain operations of the apparatus, such as the control of the winding or rewinding speed in accordance with the extent to which one or other of the reels is filled, programmable friction and braking of the reels, means for automatically stopping the apparatus in a certain preselected position, etc.

U.S. Pat. Nos. 3,564,210 and 3,834,648 already propose position indicator devices for a magnetic tape in a recording and playback apparatus, the operating principle being based on the ratio between two speeds, such as the constant linear speed at which the tape moves and the variable angular speed of one of the reels.

A position indicator, according to this invention, based on the detection of the variable speeds of the two reels would be capable of supplying information independent of the position of the tape, and this would provide an advantage, for example, when use is made of cassettes and one of these latter is introduced into the apparatus after part of the magnetic tape has already been wound onto the take-up reel. Having the ratio between the rotational speeds of the reels furthermore makes it possible to provide an absolute indication, i.e. one which is independent of the speed at which the tape moves.

These two prior devices of the aforementioned patents, moreover, both suffer from the drawback that they only indicate the external diameters of the tape windings on the reels. Now the relationship between the diameter of the winding on a reel and the effective length of the tape on the reel is a function of a number of parameters, such as the diameter of the hub of the reel and the thickness of the tape. In other words, the information provided by these prior devices on the length of tape wound onto the reels or the amount of tape still available is only valid for a certain particular type of reel and tape.

One object of the present invention is to provide a simple, reliable, accurate and inexpensive method for monitoring web movement in a transport apparatus, which will be suitable for use with a plurality of different known types of reel/web assemblies, and enable the operator to be supplied with exact information as to the amount of web still available or already used as to a particular one of the different types which is in the apparatus, information being provided directly in usable units such as minutes and seconds, and also enable a control output to be supplied, in the form of electronic signals, for example, which can be used in a suitable electronic device, for the purpose of controlling certain operations of the apparatus concerned. A further object of the present invention is to provide an apparatus for the performance of the said process.

According to the present invention there is provided a method for controlling the transfer of a flexible web member from a supply reel to a take-up reel, according to which the rotational speeds of the supply reel and the take-up reel are measured and whereby the ratio between these measurements is established independently of the speed and direction of the movement of the web member. The method comprises the steps of storing in memory for each of a plurality of web/reel assemblies of one known type or another known type, electrical signals representing a set of corresponding constants uniquely representing the physical characteristics of one of the different known types of reel/web assemblies, releasing the set of constants corresponding to the ree/web assembly in the apparatus, generating intermediate signals which represent the ratio between the speeds of the reels combining these intermediate signals with the constant recalled from memory and generating output signals representing the momentary position of the web in relation to one or other ends thereof, and using these output signals for the purpose of visually displaying the position of the web and/or of controlling certain operations of the apparatus.

The combination of the intermediate signals with the released reference informations is carried out in accordance with the formula $$\frac{x}{1+\left(\frac{P_1}{P_2}\right)^2} - y.$$

wherein $p_1/p_2$ represents the aforementioned ratio and x and y are the constants represented by the signals stored in memory.

The output signals supply indications of the quantity of web wound onto the take-up reel and represent, according to the nature of the constants x and y, either the length of web as an absolute value or as a percentage, or the winding time of the web onto the take-up reel, e.g. in minutes and seconds.

Corresponding indications relating to the supply reel are supplied by the following formula:

$$\frac{x}{1+\left(\frac{P_2}{P_1}\right)^2} - y$$

In a first application the output signals are supplied to a digital or analog counter and converted into a visual display of the position of the web member.

This counter is advantageously combined with a presetting button and an automatic stopping system enabling a certain particular position on the web to be rapidly retraced.

In a second application, the output signals are used for the purpose of modifying the voltage of the reel driving motors in accordance with the position of the web member, in such a way as to ensure that the tractive stress exerted on the latter will remain constant.

In a third application the output signals are used, during the winding or re-winding operation, for the purpose of slowing the driving motion when the end of the web is being approached and possibly at the beginning likewise.

In addition to the method described hereinbefore, this invention provides an apparatus for the performance of this method. The apparatus comprises angular speed detectors for measuring the rotational speed of each of the reels, a micro-processor having two counters totalizing the pulse signals generated by the speed detectors and a divider circuit for generating, on receiving a control signal, intermediate signals representing the ratio between the contents of the counters, a memory storing constants corresponding respectively to different types of reel and web assemblies, and a circuit for combining the intermediate signals with the constants recalled from memory and corresponding to the reel and web assembly used and generating output signals representing the instantaneous position of the web in relation to one or other of its ends.

The output signals are applied to a display device serving to indicate the position of the web member.

In one advantageous embodiment the said control signal is supplied by a third counter which stores the pulse signals of the two speed detectors, the said signal being generated at the moment at which the number of pulses totalized by this counter reaches a certain preselected value.

The constants stored in memory of the micro-processor are advantageously released by actuating corresponding keys on a control keyboard in accordance with the particular type of web and reel employed.

The system advantageously included the provision of a presetting keyboard or button and a set of comparators connected between the said keyboard and the display device in such a way as to emit a stop signal when the position of the web corresponds to the value selected on the said keyboard.

Further characteristics and special features will be apparent from the following description of an advantageous embodiment of the invention, given below by way of an example and without any limitative effect and by reference to the accompanying drawings, in which:

FIG. 1 is a schematic diagram partly in perspective, of a tape transport mechanism with microprocessor control mean;

Figure 1A:
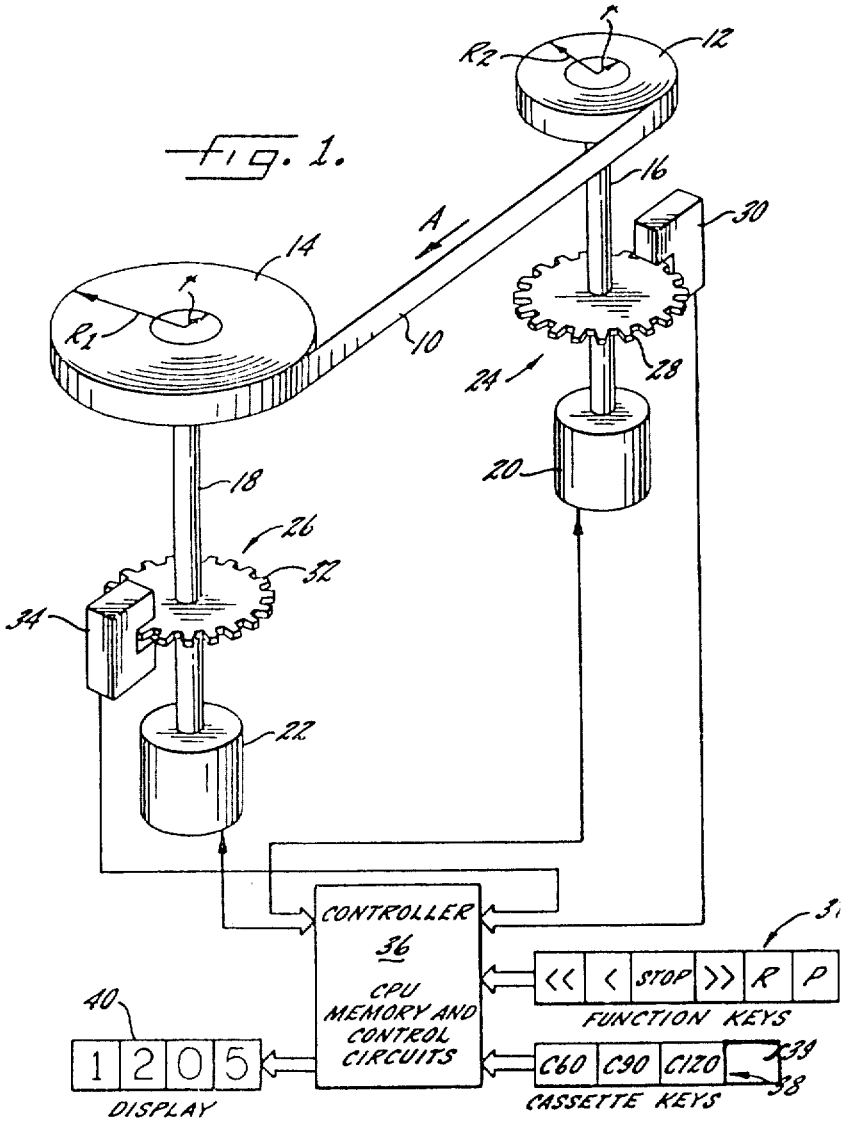
FIG. 1a shows a conventional cassette.
Figure 1A:
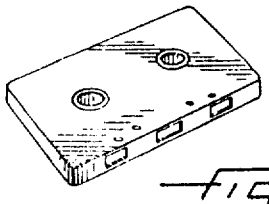

FIG. 1 shows a magnetic tape 10 which is transferred in the direction shown by the arrow A from a supply reel 12 to a take-up reel 14. The invention will be described by reference to a transport for magnetic tape recording and play-back apparatus, but it should be noted that the invention can be applied, generally speaking, to apparatus effecting the transfer of any flexible material in the form of a web or tape from a supply reel to a take-up spool. For the remainder of the description it will be assumed that the reels 12 and 14 are contained in a cassette, not shown in the drawings, but it should be noted that the device is likewise applicable to a tape deck with open reels.

Each of the two reels 12 and 14 is associated with an electric motor 20 and 22 driving them via shafts 16 and 18 respectively. With these shafts 16 and 18 are associated angular speed detectors 24 and 26 respectively, already known per se. In the example shown in FIG. 1, the said angular speed detectors 24 and 26 comprise perforated discs 28 and 32 and pulse generators 30 and 34 respectively.

The component bearing the reference number 36 is a micro-processor well known in the art conventionally including a CPU and program memory. By way of example the inputs of the said micro-processor 36 have been shown on the right-hand side of the latter, the outputs for the signals generated by the micro-processor being shown on the left. This micro-processor 36 receives input signals emanating from a control keyboard 37 enabling the operator to actuate the apparatus and to start the various functions, i.e. fast forward, movement at normal speed, stop, fast rewind, recording, pause, these functions being indicated schematically, and in the said order, by the subdivisions of the keyboard 37 in FIG. 1, proceeding from left to right.

A second keyboard 38 enables the operator to designate the type of cassette in the apparatus, such as Type C60, C-90 or C120, for each of which sets of constants representing characteristics of the respective type of cassette are stored in the memory of the micro-processor 36 in a cassette constants store. An additional control button can be provided, corresponding to a cassette of a less widely known type, constants representing the characteristics of this cassette likewise being stored in the memory of the micro-processor 36. The latter also receives, on its input side, the pulses from the pulse generators 30 and 34.

One of the outputs of the micro-processor 36 is connected to the input of a position indicator or display 40, which is of the digital type. Two other outputs of the micro-processor 36 transmit control signals via control circuit to the motors 20 and 22 in a manner described in greater detail hereinafter.

During the recording or playback of information on the magnetic tape 10 the said tape is caused to run at the speed designated as "normal" by means of a capstan associated with a pinch roller, not shown, a constant speed of rotation being imparted to the capstan by means of a motor, likewise not shown. In order to ensure that the magnetic tape 10 will be wound upon the take up reel 14 as and when it is delivered by the driving capstan, the reel 14 is driven by its motor 22 in such a way that the magnetic tape is not subjected to any abnormal tractive stress and cannot accumulate between the capstan and the reel 14. During the fast forward or fast reverse movement of the magnetic tape the latter is released from the action of the capstan by the release of the associated pinch roller, and the reel, becoming a take-up reel, is driven by its motor 20 or 22 at a high speed.

The function of the micro-processor 36 and the operations effected therein will now be described in greater detail. In summary, the microprocessor is conventional and includes a processor and memory units for storage of constants corresponding to different types of cassettes and programs to operate the processor under program control to monitor the movement of the web in the transport apparatus by determining tape position and displaying the position of the web on a display 40, and by controlling the drive motors 20, 22 in carrying out the various functions of the apparatus. For the purposes of the description reference will be made to equivalent analog circuits, the function of the micro-processor conventionally being based on digital principles.

In the embodiment of the invention shown in FIG. 1 the pulse generators 30 and 34 are devices in which a light ray is chopped by equally spaced apertures provided on the periphery of disc-shaped wheels 28 and 32. In one experimental embodiment of the invention the number of apertures per disc is 20, as shown. These pulse generators 30 and 34 generate, in a manner known per se, pulse trains which represent, either in their frequency or in their amplitude, the angular speeds of each of the reels 12 and 14.

The different types of cassette used most frequently, i.e. Types C 60, C 90 and C 120, are essentially distinguished from one another by the length of the magnetic tape, which at normal delivery speed provides 30, 45 or 60 minutes respectively of play-back or recording time for each direction or movement of the tape, or a total of 60, 90 or 120 minutes, respectively. In carrying out the invention, the apparatus disclosed herein is operable with cassettes of these different types, and provides for each such cassette a determination of absolute values of tape position. For making that determination, position determination algorithms are used including equations employing constants established by physical parameters of the cassettes including tape length and thickness and diameter of the reel hubs, and the ratio of rotational speeds of the reels. The following description explains the derivation of these equations. An elementary calculation suffices to indicate with a satisfactory degree of accuracy the length of magnetic tape wound on each of the reels as a function of the ratio of the angular speeds of the two reels 12 and 14, represented by the total number of pulses emitted by the generators 30 and 34 for a given period.

If the following symbols have the meanings given:

$l_1$ = length of magnetic tape used,
$l_2$ = length of magnetic tape not used,
L = total length of magnetic tape,
e = thickness of magnetic tape,
r = radius of hub of reels 12 and 14,
$R_1$ = external radius of winding on reel 14,
$R_2$ = external radius of winding on reel 12,
$P_1$ = number of pulses emanating from detector 34 for a given period,
$P_2$ = number of pulses emanating from detector 30 for a given period, and taking as a basis the condition which is expressed with sufficient accuracy by the equations $$l_1 \cdot e = \pi \cdot (R_1^2 - r^2),$$

$$l_2 \cdot e = \pi \cdot (R_2^2 - r^2),$$

$$L = l_1 + l_2,$$

we obtain, by means of an elementary calculation and using the equation $(R_1/R_2) = (P_2/P_1)$, the equations shown below:

$$l_1 = \frac{A}{1 + \left(\frac{P_1}{P_2}\right)^2} - B \text{(I), and}$$

$$l_2 = \frac{A}{1 + \left(\frac{P_2}{P_1}\right)^2} - B \text{(I')},$$

wherein $$A = L \cdot \frac{T^2 + 1}{T^2 - 1}$$

and $$B = L \cdot \frac{1}{T^2 - 1}.$$

T representing the ratio $p_1/p_2$ when $L = l_2$, i.e. at the beginning of the tape. T is thus a constant which characterizes each type of cassette and which can be determined either mathematically or by measurement.

If the two terms of the equation (I) and (I') are divided by L, we obtain the following:

$$\text{With } \frac{A}{L} = A' = \frac{T^2 + 1}{T^2 - 1} \text{ and } \frac{B}{L} = B' = \frac{1}{T^2 - 1}:$$

$$\frac{l_1}{L} = \frac{A'}{1 + \left(\frac{P_1}{P_2}\right)^2} - B' \text{(II) and}$$

$$\frac{l_1}{L} = \frac{A'}{1 + \left(\frac{P_2}{P_1}\right)^2} - B' \text{(II')}$$

It is also possible to multiply the two terms of Eq. (II) and (II') by the duration 67 of the cassette, of which the usual types may have the values defined above. We then obtain, with $$A'' = A' \times \delta$$

and $$B'' = B' \times \delta$$

the following:

$$l_1 = \frac{A''}{1 + \left(\frac{P_1}{P_2}\right)^2} - B'' \text{ (III) and}$$

$$l_2 = \frac{A''}{1 + \left(\frac{P_2}{P_1}\right)^2} - B'' \text{ (III')}$$

Among the above Equations, (I) and (I') represent the length of the magnetic tape wound on the take-up reel and on the supply reel respectively i.e. a position determination in terms of linear dimension; Equations (II) and (II') represent the ratios of the length of the magnetic tape wound on the take-up reel 14 and on the supply reel 12 respectively to its total length; i.e. a position determination in non-dimensional terms; while Equations (III) and (III') represent the time taken by the magnetic tape 10 to reach the radius $R_1$ on the take-up reel 14, and the Radius $R_2$ on the supply reel 12 respectively i.e. a position indication in terms of time, representing the playback time or recording time which has elapsed since the beginning of the magnetic tape or which remains until the end of the magnetic tape respectively.

The sets of constants A,A',A'', and B,B',B'' for the different types of cassette can be determined statistically, so that account can be taken, with sufficient accuracy, of the very slight variations which may exist between different cassettes of one and the same type and which are caused, for example, by inaccuracies in assembly or manufacture. These same constants can be determined in a similar manner for cassettes which have been recorded in advance and not referenced and of which the lengths vary from one individual cassette to another.

To obtain valid results, either of these equations may be used in the micro-processor 36. For the apparatus proposed, use will be made of the Equation (II) as long as the type of cassette has not been designated by the operator; when it has been designated, on the other hand, Equation (III) will be adopted. Thus, as soon as a cassette has been introduced into the apparatus, the micro-processor 36, after having received the required information from the keyboard 38 designating the type of cassette in the apparatus, transmits to the display 40 a signal representing the position of the tape calculated using Equation (III) as the magnetic tape runs off one reel and transfers to the other. The information supplied by the display 40 is thus, in this case, a time indication. The keys of the keyboard 38 are preferably luminous, enabling the indication of the particular type of cassette loaded in the apparatus to be displayed. These keys, when actuated, automatically cause the reading from memory, in the micro-processor 36, of stored signals corresponding to the sets of constants for the type of cassette in the apparatus, these constants being required for the calculation of tape position utilizing Equation (III) in the manner described above.

Figure 2:
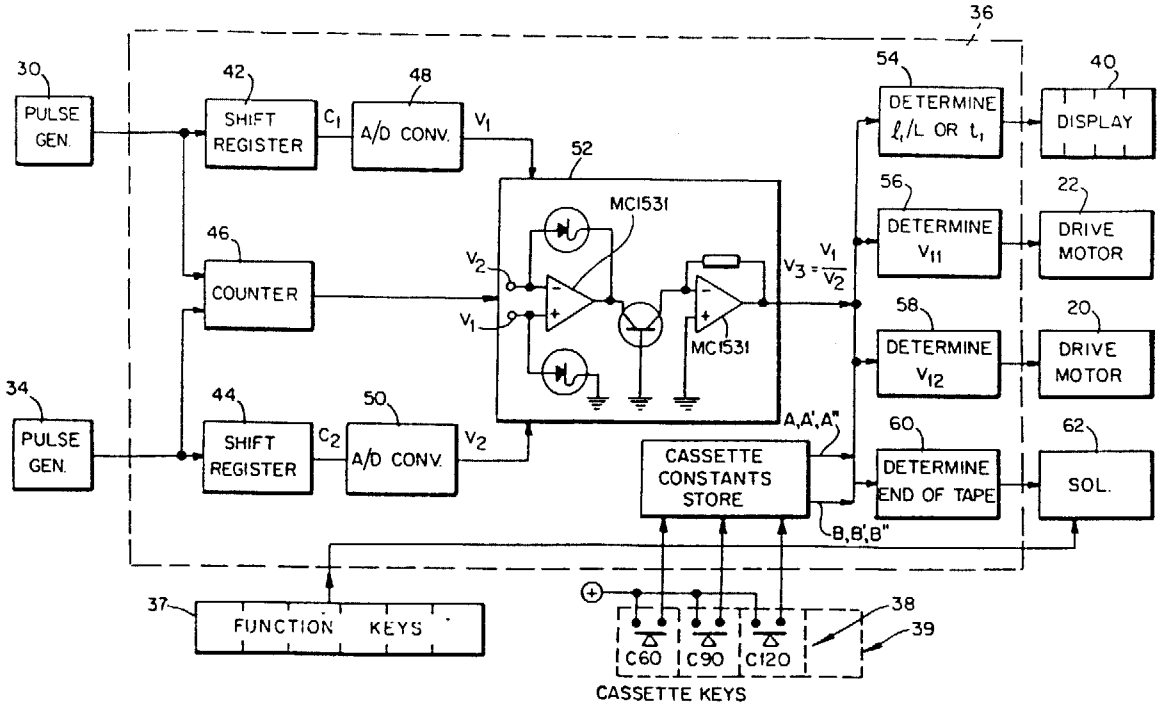
FIG. 2 is a block diagram illustrating the operation of an apparatus according to the present invention.

FIG. 2 illustrates, by means of a block diagram, the various operations performed by the micro-processor 36 under program control, the operations being illustrated by functions performed by analog computer circuits and control circuits. For the purposes of determining the ratio of rotational speeds of the reels, the pulse signals generated by the photo-electric pulse generators 30 and 34 are supplied to counters 42 and 44 of the microprocessor 36 by which these pulses are counted. The two counters 42 and 44 are identical to each other and preferably of the "shift register" type well known in itself. They thus consist of a number of blocks, such as described, for example, in "The TTL Data Book for Design Engineers" (1st edition), Texas instrument, which blocks may contain a given number of pulses or bits, the number in an experimental prototype being 256. These blocks, which are four in number, are loaded, for example, from left to right. When the four blocks of a counter are full, the last block, as viewed in the direction in which they are loaded, is emptied of its contents in such a way that the information recorded in each of the blocks preceding it in the said direction can be shifted to the subsequent block. The preceding block is thus evacuated and can receive further pulse signals. The ratio of reel rotational speeds which is represented by the number of pulses in the two counters 42, 44 is thus more accurate, as it is based upon a larger numer of items of information, regularly "brought up to date."

The ratio of the number of pulse signals generated by the two pulse generators, 33, 34, i.e. the ratio of the contents of the two shift registers 42 and 44, is determined periodically, these contents being shown hereinafter, for the purposes of the description, by the symbols $C_1$ and $C_2$. The ratio $(C_1/C_2)$ measured at any stage of transfer of the tape from reel to reel is, for purposes of this description, considered equal to the ratio $(P_1/P_2)$ of the pulses generated by the two pulse generators 34 and 30 during a given period.

This determination of the reel speed ratio and the consequent determination of tape position using the tape position determination Equation employing the cassette constants and the reel speed ratio as an input variable, is preferably periodically repeated, or by means of a counter and control signal generator 46 which receives the pulse trains of the two pulse generators 30 and 34 and which initiates a determination of position by generating a control signal gating the output from the D/A converters 48, 50 to the speed ratio circuit 52 whenever its contents reach a predetermined value which, in one experimental embodiment of the invention, is fixed at 16, representing a predetermined period for position determinations.

The signals $C_1$ and $C_2$ emanating from the shift registers 42 and 44 are thus applied to the inputs of the two digital-analog converters 48 and 50 respectively. The voltages $V_1$ and $V_2$ at the output of each of these converters 48 and 50 thus represent the number of pulses stored in by control signals from the control signal generator, the shift registers 42 and 44, and the ratio between the voltages $V_1$ and $V_2$ represents the ratio of speeds of the reels.

The two voltages $V_1$ and $V_2$ are applied from the D/A converters 48, 50 to the inputs of a speed ratios determination circuit 52 which is implemented with operational amplifiers for purposes of illustration of the operations performed, known per se.

After the periodic control signal generated from the counter and control signal generator 46, the speed ratios circuit 52 calculates the ratio $(C_1/C_2)$, generating a voltage signal $V_3=(V_1/V_2)$. This signal $V_3$ is applied in four data processing circuits 54, 56, 58 and 60, each consisting of operational amplifiers known per se and therefore not described in detail.

The diagrams show, by way of illustration, the types of amplifier suitable for use in the equivalent circuits proposed by the invention. These amplifiers are described in "Semiconductor Data Library," Vol. 6, Linear Integrated Circuits, Series A, of Motorola Semiconductor Products Inc. For further information on the assembly of these components and on the circuits used, reference may be made to "L'amplificateur Operationnel—Principles et Applications" by R. DAMAYE, 2nd edition, published by the Societe des Editions Radio.

The circuit 54 effects the operations to determine tape position using Equations (II) or (III), depending on which set of constants are derived from the constants store and utilized in the algorithmic operations performed by the circuit. Thus, the circuit 54 generates a signal proportional to $(l_1/L)$ or to $t_1$, which is applied to the input of the display unit 40 indicating the position of the magnetic tape in relation to its total length as a percentage, or to the end of the tape on one of the reels as a time indication.

As will be described in fuller detail below, the circuits 56 and 58 are operating control circuits the purpose of which is to determine and apply variable voltages to the driving motors 20 and 22 and thereby vary the output torque in accordance with the position of the tape.

The circuit 60 serves to generate a signal the purpose of which is to supply a circuit 62 designed to control the reduction of the reel driving speeds.

Figure 3:
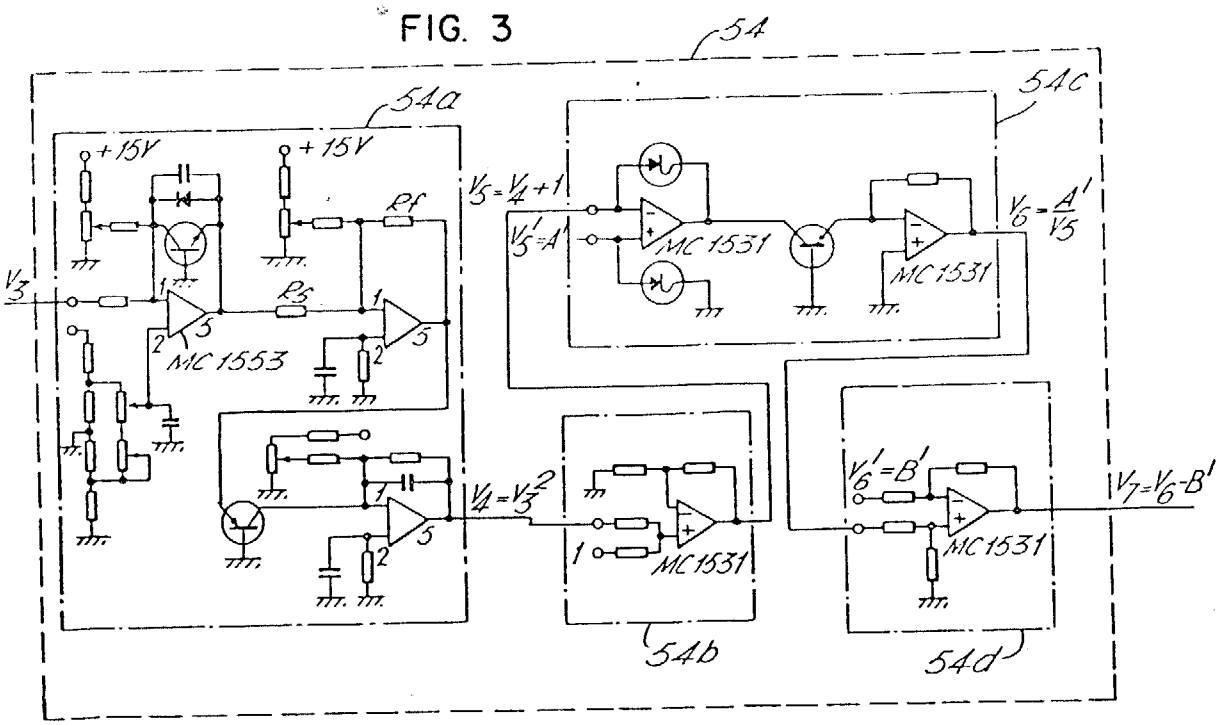
FIG. 3 is of an equivalent electronic circuit diagram for a position indicator.

The operations effected by the microprocessor 36 to determine and supply tape position signals to the display 40, are represented in the determine ($l_1/L$) or $t_1$ circuit 54 which will now be described in greater detail by reference to the equivalent circuit diagram of FIG. 3. The signal $V_3$ from the reel speed ratios circuit 52 representing the ratio of the voltages, $V_1/V_2$, is applied to the input of a squaring circuit 54a may be implemented in any conventional way as by log and anti-log function circuits as shown and generating a voltage signal $V_4=V_3^2$. This squaring circuit 54a comprises two resistors Rf and Rs of which the ratio determines the exponent of the output signal, in this case (Rf/Rs=2. The output signal $V_4$ is applied to one of the input terminals of an adder circuit 54b, another input terminal (labelled "1") of this adder circuit being fed by a voltage signal of unit magnitude. The said adder circuit 54b thus supplies a voltage $V_5=V_4+1$, which is applied to one of the input terminals of a divider circuit 54c. A second input terminal of this divider circuit 54c receives a signal $V_5'$ representing the constant A' defined above, from the cassette constants store (FIG. 2). This input terminal may be switched automatically into circuit in such a way as to receive a signal representing the constant A", by actuating the appropriate button of the keyboard 38, which releases the stored information from the cassette constants store corresponding to the type of cassette selected.

The divider circuit 54c generates a voltage signal $V_6=(A'/V_5)$ which is applied to one of the input terminals of a subtraction circuit 54d, the other input terminal of this circuit 54d receiving a voltage signal $V_6'$ representing the constant B', or the constant B" if the cassette loaded in the apparatus is know to the operator and designated by operation of that control button of the keyboard 38 which corresponds to the type of known cassette. This subtraction circuit 54d supplies a voltage signal $V_7=V_6-B'$ representing the calculated value for $l_1/L$ according to Equation (II) and thus representing that fraction of the magnetic tape which is wound onto the take-up reel. It should be evident that if the constants A" and B" are introduced into the circuits 54c and 54d by connecting the input terminals A' and B' to a memory unit storing said constants A" and B" and operated to apply voltage levels representing said constants to the input terminals in response to operation of the control button designating the known type of cassette in the apparatus, this will provide a voltage signal representing the value of $t_1$ according to Equation (III), i.e. a magnetic tape position indication as a unit of time. It also should be evident that it is equally possible to introduce the constants A and B into the circuits 54c and 54d, by supplying the input terminals from a memory unit storing said constants A, B in order to obtain a signal representing 1, according to Equation I, i.e. an indication of the length of tape wound onto the takeup reel.

Similarly, the microprocessor 36 may be controlled to carry out tape position determinations using Equations I', II' or III', in place of Equations I, II and III. It will suffice to permute the terminals of the divider circuit in such way as to operate on a signal proportional to ($P_2/P_1$) instead of ($P_1/P_2$). In this case the information supplied will relate, according to the particular algorithm adopted, to the absolute length or length percentage of the tape still available on the delivery reel or the time still required for its transfer to the take-up reel.

The output signal of the circuit 54 is converted into a digital value by means of a conventional analog-digital converter and hereafter supplied to the input terminal of a display device 40 of the luminescent diode or liquid crystal type.

As the only variable entering into the tape position determinations using Equations (I), (II) and (III) is a ratio between two magnitudes, in the present embodiment the number of pulse signals representing the angular speeds of the reels, the foregoing calculations and thus the displayed indication will always be valid, regardless of the speed at which the magnetic tape transferred.

As and when the magnetic tape is wound onto the take-up reel the diameter of this latter increases, and as the different types of motor by which these reels are driven in known apparatus have a constant torque, set for a medium position of the tape, the tractive stress exerted on this latter will decrease in proportion. Now it has been found that if the magnetic tape is subjected to a constant traction throughout its run-off at normal speed, such properties as wow and flutter in the playback are greatly improved.

To ensure constant traction on the magnetic tape throughout its movement the driving motor has to be controlled in such a way as to modify the torque in accordance with the diameter of the take-up reel. Now as the ratio of the pulses $p_1$ and $p_2$, counted in the counters 42 and 44, represents the variation in the winding diameter of the reels, the rotational speed of the motor 22 is controlled by modifying its feed voltage by means of the signal $V_3$ supplied by the circuit 52 and representing the ratio of these pulse signals. These are various simple formulae by which the voltage to be applied to the terminals of the motor can be determined mathematically, e.g.:

$$V=E-F\times(C_1/C_2)$$

Figure 4:
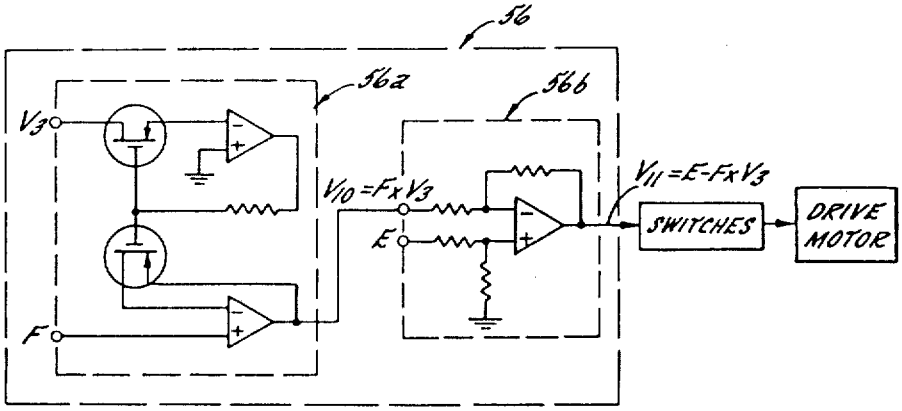
FIG. 4 is an equivalent electronic circuit diagram for the control of the reel driving motors.

These operations are carried out in the circuit 56 for the motor 22 and in the circuit 58 where the motor 20 is concerned. FIG. 4 shows the details of the circuit 56. The signal $V_3$ (see FIG. 2) is applied to one of the input terminals of a multiplier circuit 56a, a second input terminal of this circuit 56a receiving a signal representing the constant F. This multiplier circuit 56a emits a signal $V_{10}=F\times V_3$, which is applied to one of the input terminals of a subtraction circuit 56b. A second input terminal of this subtraction circuit 56b receives a signal E representing approximately the maximum voltage to be applied to the motor.

This circuit 56b generates a signal $V_{11}=E-F\times V_3$ corresponding to the above formula and representing the control voltage for the motor 22. This voltage increases to the extent to which the ratio ($C_1/C_2$) decreases, i.e. in the degree in which the take-up reel 14 fills up. This increase caused by the increase in the diameter of the windings on the take-up reel, thereby ensuring a perfectly constant traction on the magnetic tape throughout its movement. It should be noted that the control circuit 58 of the motor 20 is identical to the circuit 56 and will not be described in detail.

Figure 5:
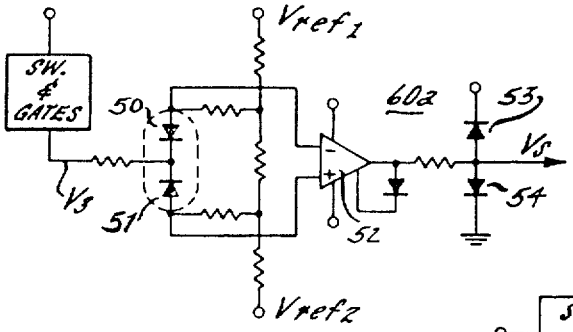
FIGS. 5 and 6 show two examples of equivalent electronic circuit diagrams for the control of the reels of the driving motors.
Figure 6:
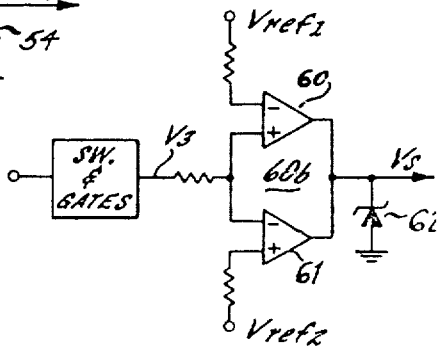

A further advantageous application of the present invention is the gradual reduction of the high winding and re-winding speeds when one of the ends of the tape is nearly reached. This slowing-down can be prolonged until the tape comes to a complet stop, thus enabling the known automatic stopping devices to be replaced. FIGS. 5 and 6 illustrate two examples of circuits 60a and 60b which can be used for the purpose of generating a control signal to be applied to the circuit 62 in order to reduce the speeds in accordance with the number of pulse signals emitted by the counters 30 and 34. The circuits 60a or 60b thus receive from the circuit 52 (see FIG. 2) the signal $V_3$ representing the ratio between the rotational speeds of the two reels. These two circuits, furthermore, are connected to two reference voltages selected arbitrarily and representing the rotational speed ratio between the two reels at the beginning and at the end of the tape run-off respectively. These reference voltages may also be associated with the types of cassette and thus selected by means of the keyboard 38 when the type of cassette is being selected.

Figure 7:
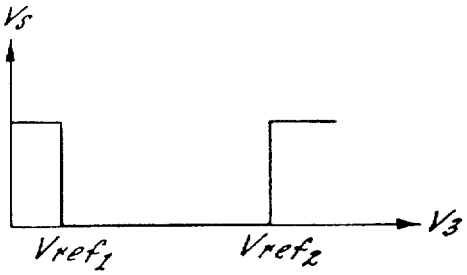
FIG. 7 is a voltage diagram of a speed reducing circuit.

Referring to FIG. 5, when the input voltage $V_3$ is inside the window between the voltages $V_{ref1}$-$V_{ref2}$, both diodes 50, 51 are conducting and the differential voltage between inputs to the operational amplifier 52 equals zero. As the input voltage $V_3$ shifts outside said window, one of the two diodes 50 or 51 is cut off and the input voltage $V_3$ is detected either on the non-inverting or inverting input to the operational amplifer, thus the operational amplifier 52 produces an output voltage $V_s$ of a predetermined magnitude as indicated in FIG. 7. The diodes of 53, 54 insure anti-latch-up for the operational amplifier 52 and output voltage limitation for increasing switching time.

The circuit disclosed in FIG. 6 operates on the same principal, but the window between the voltages $V_{ref1}$-$V_{ref2}$ is insured by two operational amplifiers 60, 61 mounted in parallel. The reference voltage is applied to the inverting terminal of the operational amplifier 61 and to the non-inverting terminal of the operational amplifier 60. Thus, when the input voltage $V_3$ is inside the window $V_{ref1}$-$V_{ref2}$, the output of both operational amplifers 60, 61 is low, but shifts high as soon as either operational amplifier is biased to conduct and produce the output voltage $V_s$. The diode 61 is used as the output for limiting the output voltage $V_s$. Thus, as long as the magnitude of the signal $V_3$ is included in the window between these two threshold voltage $V_{ref1}$ and $V_{ref2}$, the output signal $V_s$ generated by the operational circuits of the assemblies 60a or 60b remains at level 0 (see FIG. 7). As long as the signal $V_s$ remains zero, the circuit 62 (see FIG. 2) is not influenced by the operational circuits 60a or 60b and the take-up reel is driven at high speed. When the amplitude of the signal $V_3$ becomes lower than $V_{ref1}$ or higher than $V_{ref2}$ the signal $V_s$ will occur at the output of the operational circuits 60a or 60b (see FIG. 7). This signal $V_s$ is applied to the circuit 62 and has the effect of braking the supply reel. Circuits of FIGS. 5 and 6 therefore come into operation when the rapid winding or re-winding is started up, whether at the beginning or at the end of the tape, immediately before the drive of the take-up reel is shut off. This apparatus enables rapid winding or re-winding to be started up far more quickly than in the case of the systems at present in use, since it is now certain that thanks to this speed reduction no abnormal tractive stress will be exerted on the ends of the magnetic tape.

Figure 8:
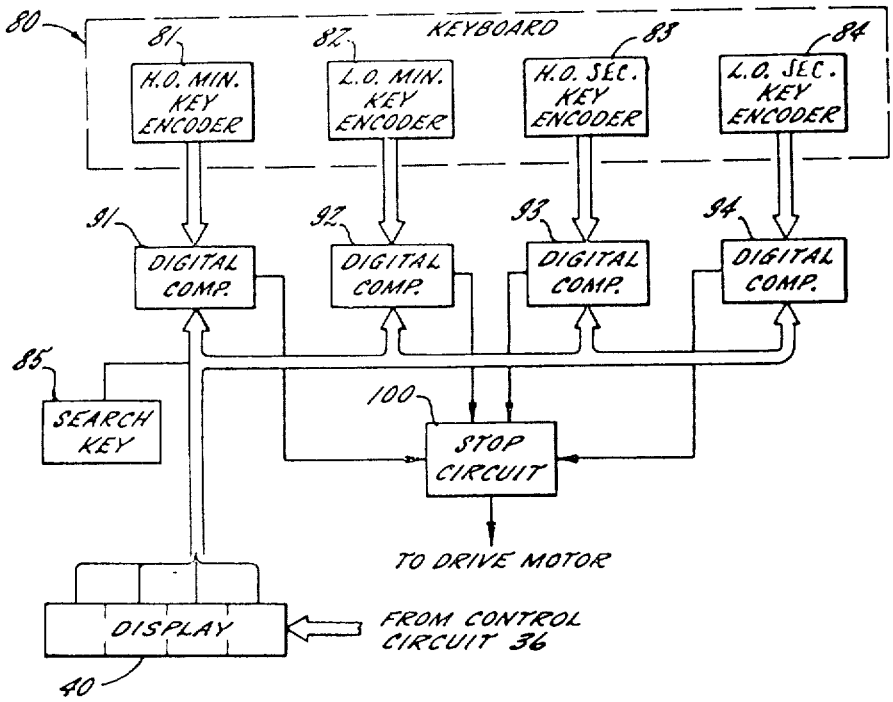
FIG. 8 is an equivalent block diagram of a search system.

FIG. 8 is a schematic block diagram of an equivalent circuit enabling the tape to be rapidly wound or rewound back to a predetermined position and the drive to be automatically stopped once the tape is in the position corresponding to the passage sought.

By means of a keyboard 80 consisting of 4 switches with numerical indications it is possible to display that position of the tape to which it is desired to return and by actuating a "search" button 85 the said position is thus traced. This operation is effected by the microprocessor, but for the purpose of the description an equivalent block diagram will likewise be referred to.

If the counter does not "know" the present position of the tape, i.e. if the cassette has only just been inserted into the apparatus, the start of the search operation will cause the tape to move to a sufficient extent (at normal speed) to enable the counter to "know" the said position.

If, on the other hand, the counter "knows" the position indication, the search operation is effected by comparing this indication with that of the keyboard 80. The search will be effected either at fast forward speed or at fast reverse speed, according to the sign of the difference between the aforementioned two indication values. The computing is then effected by comparing the momentary value of the position indication of the counter with that displayed by the keyboard. When the two values are identical the tape drive is stopped. FIG. 8 shows 4 digital display switches 81, 82, 83 and 84, schematically illustrating the presetting keyboard 80. The informations contained therein are directly coded in the switch itself. The outputs of these switches 81,82,83 and 84 are connected to the input terminals of camparators 91, 92,93 and 94 respectivey, and these latter may be of the type 7486 (Texas Indstruments) which receive in a second input terminal the coded pulse signals from the counter 40 which displays the tape position indication.

When the "search button" 85 is actuated, the comparators 91,92,93 and 94 are set in operation and compare, all at the same time, the information provided by the keyboard 80 (subdivided into 4 figures) and that emanating from the numerical display counter 40. When all the comparators obtain zero at their output terminal (i.e. when the figures of the counter 40 are equal to those of the keyboard 80) a "STOP" circuit 100 generates a pulse which serves to stop the apparatus. That part of the tape which corresponds to the preselection is thus in position in front of the magnetic heads.

To increase the accuracy of the "search" operation, the system has been designed in such a way as to enable the run-off speed of the magnetic tape to be reduced when the difference between the value of the position indication and that of the keyboard 80 is below a certain constant (e.g., 30 sec). The final part of the search operation being effected at a low speed, the counter displays a very accurate position indication, the precision of the preselection operation thus being improved.

The system is also designed in such a way that once the "search" has been carried out the apparatus automatically causes the tape to move at normal speed when the "search" and "normal speed" button have been actuated at the same time.

Instead of a keyboard 80 with four switches the preselection can also be advantageously effected by means of a keyboard with digital keys numbered from 0 to 9. In this case the value selected by this numerical keyboard is displayed on the counter 40 while the information relating to the position of the tape is stored in the apparatus.

The "search" key 85, shown in an isolated position in FIG. 8, can naturally be incorporated in the keyboard 37 shown in FIG. 1.

Finally, it should be emphasized that an experimental apparatus in which the present invention has been applied has enabled unprecedented degrees of accuracy to be achieved, both as regards the indication of the position of the magnetic tape and as regards the operation of controlling the driving motors in accordance with the said position.

This accuracy is mainly due to the fact that average values are employed in the different operational phases, e.g. in the counters 42, 44, and for the storage of the constants.

As the description refer to the use of micro-processors, the formulae employed have been deliberately simplified, to enable use to be made of components of this type which are customarily used at the present time and of which the cost is thus acceptable. Despite these simplifications the ratio of the precision to the number of components is an excellent one, as has been confirmed by an experimental prototype. The technician in this field can naturally use more advanced components and circuits if desired, thus enabling more precise formulae to be adopted, without thereby departing from the scope of the invention.

It should also be noted that the invention can be applied to other purposes than that to which the above description relates. Generally speaking, it is applicable to any apparatus or installation involving the monitoring and/or control of the transfer of a material in web or thread form from a supply or delivery reel to a take-up reel, particularly in the sphere of information storage or memorization. Within the scope of such applications the invention makes it possible, in particular, for certain types of recording tape, to dispense with a synchronization track on which timing pulses are recorded.

What we claim is:

1. A method of monitoring the transfer of a web from reel to reel of a web/reel assembly, in apparatus having means generating signals representing respectively the rotational speeds of the reels, said method comprising the steps of:

storing in memory electrical signals representing constants uniquely characterizing said reel/web assembly and derived from the physical parameters thereof, which constants when used in web position determination algorithms with the ratio of rotational speeds of the reels measured anywhere along the length of the web provides absolute values of web position, periodically measuring the ratio between the rotational speeds of said reels based on said rotational speed signals from said generating means, deriving from said memory signals representing the constants for said reel/web assembly, determining absolute values of successive web positions using said web position position algorithms with said constants and said periodic measurements of reel speed ration, and monitoring the transfer of the web in said apparatus according to said absolute values of successive web positions.

2. A method according to claim 1 wherein said step of monitoring transfer of the web in said apparatus according to said absolute values of successive web positions includes:

producing output signals representing said absolute values of successive web positions, and displaying said successive web positions represented by said output signals to reflect the continuous changes in web position as the web is transferred from reel to reel.

3. A method according to claim 1 wherein said step of monitoring the transfer of the web in said apparatus according to said absolute values of successive web positions, includes:

producing output signals representing said absolute values of successive web positions, and controlling said drive means according to said output signals.

4. A method according to claim 1, wherein said web position determination algorithms include calculations carried out according to the following formulae:

$$l_1 = \frac{A}{1+\left(\frac{P_1}{P_2}\right)^2} - B \text{ or } l_2 = \frac{A}{1+\left(\frac{P_2}{P_1}\right)^2} - B$$

wherein:

$l_1$ and $l_2$ are absolute values of lengths of web wound on the take-up reel and supply reel respectively, represented by the output signals;

$P_1$ and $P_2$ are the rotational speeds of the take-up reel and supply reel respectivey; and A and B are constants represented by signals stored in memory.

5. A method according to claim 1, wherein said web position determination algorithms include calculations carried out according to the following formulae:

$$\frac{l_1}{L} = \frac{A'}{1+\left(\frac{P_1}{P_2}\right)^2} - B' \text{ or } \frac{l_1}{L} = \frac{A'}{1+\left(\frac{P_2}{P_1}\right)^2} - B'$$

wherein:

L is the total length of the web member;

$l_1/L$ and $l_2/L$ are absolute values of the ratio of the length of the web wound on the take-up reel and supply reel respectively to its total length represented by the output signals;

$P_1$ and $P_2$ are the rotational speeds of the take-up reel and supply reel respectively; and A' and B' are constants stored in memory.

6. A method according to claim 1, wherein said web position determination algorithms include calculations carried out according to the following formulae:

$$t_1 = \frac{A''}{1+\left(\frac{P_1}{P_2}\right)^2} - B'' \text{ or } t_2 = \frac{A''}{1+\left(\frac{P_2}{P_1}\right)^2} - B''$$

wherein:

$t_1$ and $t_2$ are absolute values of the distance, in terms of time, from the beginning of the web on the take-up reel, and remaining to the end of the web on the supply reel, respectively, represented by the output signals;

$P_1$ and $P_2$ are the rotational speeds of the take-up reel and supply reel respectively; and A'' and B'' are constants represented by signals stored in memory.

7. A method of monitoring the transfer of a web from reel to reel of a web/reel assembly, in apparatus operable with web/reel assemblies of different types each characterized by known physical parameters, said apparatus having reel speed detectors, said method comprising the steps of:

storing in memory for each of a plurality of web/reel assemblies of one known type or of another known type, signals representing a set of corresponding constants uniquely characterizing the respective web/reel assembly and derived from the physical parameters thereof, which set of constants when used in web position determination algorithms with the ratio of reel speeds measured anywhere along the length of the web provides absolute values of web position relative to one end of the web of an intermediate portion of the web being transferred from one reel to the other, measuring the ratio between the reel speeds provided by said detectors, designating that the web/reel assembly in the apparatus is of one known type or of another known type, deriving the set of constants corresponding to the designated web/reel assembly from said signals stored in memory, determining the position relative to one end of the web of an intermediate portion of the web being transferred from one reel to the other, using said web position determination algorithms with the derived constants and the measured ratio of reel speeds, and monitoring the transfer of the web according to said determined position.

8. A method of monitoring the transfer of a web according to claim 7 in which the steps of measuring the ratio between the reel speed, and determining the position of an intermediate portion of the web, using said web position determination algorithms, are carried out periodically, to determine the positions of successive portions of the web, and including the further step of displaying the successive positions of the web on a display to mmonitor the transfer of the web.

9. A method according to claim 1 wherein the step of monitoring transfer of the web includes controlling the voltage supplied to drive motors for the reels in accordance with the output signals, to vary the output torque of the motors so as to maintain substantially constant tractive stress exerted on the web.

10. A method according to claim 1 in apparatus having drive means for moving the web at normal speed, or at fast speed in both forward and rewind directions, including the step of controlling the rotational speed of the reels in accordance with the position of the web during fast speed forward or rewind movement to slow the speed of the web a predetermined distance from the end of the web.

11. A method according to claim 1 including the step of actuating an automatic stop device when the end of the web member is being approached as indicated by the output signals representing web positions.

12. A method according to claim 9, wherein the voltage supplied to drive motors for the reels is controlled in accordance with the following formula:

$$V = E - F(C_1/C_2)$$

wherein:

V is the feed voltage applied to the input terminals of the driving motor;

E is the maximum feed voltage to be applied;

$(C_1/C_2)$ is the ratio between rotational speeds of the reels.

13. A method according to claim 7, wherein said web position determination algorithms include calculations carried out according to the following formulae:

$$l_1 = \frac{A}{1 + \left(\frac{P_1}{P_2}\right)^2} - B \text{ or } l_2 = \frac{A}{1 + \left(\frac{P_2}{P_1}\right)^2} - B$$

wherein:

$l_1$ and $l_2$ are absolute value of lengths of web wound on the take-up reel and supply reel respectively, represented by the output signals;

$P_1$ and $P_2$ are the rotational speeds of the take-up reel and supply reel respectively, and A and B are constants represented by signals stored in memory.

14. A method according to claim 7, wherein said web position determination algorithms include calculations carried out according to the following formulae:

$$\frac{l_1}{L} = \frac{A'}{1 + \left(\frac{P_1}{P_2}\right)^2} - B' \text{ or } \frac{l_1}{L} = \frac{A'}{1 + \left(\frac{P_2}{P_1}\right)^2} - B'$$

wherein:

L is the total length of the web member;

$l_1/L$ and $l_2/L$ are absolute values of the ratio of the length of the web wound on the take-up reel and supply reel respectively to its total length represented by the output signals; $P_1$ and $P_2$ are the rotational speeds of the take-up reel and A' and B' are constants stored in memory.

15. A method according to claim 7, wherein said web position determination algorithms include calculations carried out according to the following formulae:

$$t_1 = \frac{A''}{1 + \left(\frac{P_1}{P_2}\right)^2} - B'' \text{ or } t_2 = \frac{A''}{1 + \left(\frac{P_2}{P_1}\right)^2} - B''$$

wherein:

$t_1$ and $t_2$ are absolute values of the distance, in terms of time, from the beginning of the web on the take-up reel, and remaining to the end of the web on the supply reel, respectively, represented by the output signals;

$P_1$ and $P_2$ are the rotational speeds of the take-up reel and supply reel respectively; and A'' and B'' are constants represented by signals stored in memory.

16. A method of controlling the transfer of tape from reel to reel in tape/reel assemblies, said apparatus having drive means for the tape controllable to vary the speed of tape movement, and reel speed detectors, said method comprising the steps of:

measuring at successive intervals the ratio of speeds of the reels provided by said detectors,

*providing electrical signals representing constants uniquely characterizing said tape/reel assemblies,* determining successive tape positions as the tape is moved from reel to reel, based on the ratio of reel speeds measured at said intervals, *and said signals representing said constants,* manually entering a target tape position predetermined by the operator, controlling said drive means to carry out a search sequence of tape movement, including engaging said drive means to move said tape toward a target tape position at a first speed, comparing successive determined tape positions with a predetermined target position as the tape moves toward said target position, controlling said drive means further in said search sequence to shift from said first to a slower speed upon movement of the tape to a determined tape position spaced a known distance ahead of said predetermined target position, and controlling said drive means to complete the search sequence and stop the tape upon movement of the tape said known distance to the predetermined target position.

17. A tape transport apparatus for cassettes of a known type having two reels carrying tape, said apparatus comprising, drive means for moving the tape from reel to reel, reel speed detectors, controller means connected to said reel speed detectors and said drive means, said controller means including means for periodically measuring the ratio of speeds of the reels provided by said detectors and determining absolute values of successive tape positions as tape is moved from reel to reel using tape position determination algorithms employing constants uniquely characterizing said type of cassette and derived from the physical parameters thereof including the length of tape in the cassette, and said measured ratios of rotational speeds of the reels, and means for monitoring tape movement according to tape positions determined by said controller means.

18. A tape transport apparatus according to claim 17, including display means operated by said controller means to display tape positions determined by said controller means.

19. A tape transport apparatus according to claim 17, wherein said drive means is operable to provide fast and normal tape speeds and to stop the tape, and said drive means is controlled to change tape speeds responsive to tape movement to predetermined positions.

20. A tape transport apparatus according to claim 17, including manually operable means to enter predetermined positions, and wherein said controller means includes means comparing determined tape positions with predetermined positions and controlling said drive means to stop the tape responsive to tape movement to predetermined positions indicated by said comparing means.

21. A controller means in tape transport apparatus according to claim 17, wherein said controller means includes a processor unit, dedicated memory means for said constants, and program memory means storing programs operating said processor unit under program control to measure said ratios of rotational speeds of said reels, to derive from said dedicated memory means said corresponding set of constants, to determine said successive tape positions using said tape position determination algorithms, and to control said drive means to monitor the tape movement.

22. A tape transport apparatus for cassettes having two reels carrying tape, said apparatus being operable with cassettes of different known types, each having different known lengths of tape and comprising drive means for moving the tape from reel to reel in a cassette in the apparatus, reel speed detectors, controller means connected to said reel speed detectors and said drive means, and means designating for the controller means the type of cassette in the apparatus, said controller means including means for periodically measuring the ratio of speeds of the reels provided by said detectors, means determining absolute values of successive tape positions as tape is moved from reel to reel using tape position determination algorithms employing constants for the cassette in the apparatus and said measured ratios of rotational speeds of the reels;

dedicated memory means storing for each of a plurality of known types of cassettes, a set of corresponding constants used in said position determination algorithms, and means deriving the set of constants from said memory means corresponding to the designated cassette, for said controller means to employ in said algorithms for determining successive tape positions.

23. A tape transport apparatus according to claim 22, wherein said drive means is operable to provide fast and normal tape speeds and to stop the tape, and said drive means is controlled to change tape speeds responsive to tape movement to predetermined positions.

24. A tape transport apparatus according to claim 22, including manaully operable means to enter predetermined positions, and wherein said controller means includes means comparing determined tape positions with predetermined positions and controlling said drive means to stop the tape responsive to tape movement to predetermined positions indicated by said comparing means.

25. A controller means in tape transport apparatus according to claim 22, wherein said controller means includes a processor unit, and program memory means storing programs operating said processor unit under program control to measure said ratios of rotational speeds of said reels, to derive from said dedicated memory means said corresponding set of constants, to determine said successive tape positions using said tape position determination algorithms, and to controls said drive means to monitor the tape movement.

26. A tape transport apparatus according to claim 22, including display means operated by said controller means to display tape positions determined by said controller means.

27. In a tape transport apparatus for cassettes having two reels carrying tape, said apparatus being operable with cassettes having different known lengths of tape, and having drive means for moving the tape from reel to reel, means for generating pulses representing the rotational speeds of the reels upon tape movement, and controller means receiving said reel pulses and providing for each such cassette absolute determinations of successive tape positions using tape position determination algorithms employing constants for the cassette in the apparatus and the ratio of rotational speeds of the reels measured from said reel pulses as the tape is transferred from one reel to the other, the combination in said controller means comprising:

means including registers receiving and counting reel pulses, for measuring at successive intervals the ratio of rotational speeds of said reels based on the counts in said registers, dedicated memory means storing for each of a plurality of cassettes having tapes of one known length or of another known length, a set of corresponding constants used in said position determination algorithms, means deriving from said memory means the set of constants corresponding to the cassette loaded in the apparatus, means determining successive tape positions using said tape position determination algorithms with said set of constants corresponding to the cassette loaded in the apparatus and speed ratios of said reels measured at successive intervals, and means controlling said drive means to monitor the tape movement according to said successive determined tape positions.

28. Transport apparatus for web/reel assemblies which may be loaded into and removed from the apparatus, said reel/web assemblies having two reels carrying lengths of web, and determining for said web/reel assemblies absolute values of the position of a web portion relative to one end of the web, using web position determination algorithms employing constants established by physical parameters including length of web for the web/reel assembly loaded in the apparatus and the ratio of rotational speeds of the reels as the web portion is being transferred from one reel to the other, said tape transport apparatus comprising:

means generating pulses representing the rotational speeds of the reels, means including registers for receiving and counting said pulses, and measuring the continuously changing ratio of rotational speeds of said reels as the web is transferred from reel to reel based on the counts in said registers, dedicated memory means storing for each of a plurality of web/reel assemblies of the same type having webs of one known length or of another known length, a set of corresponding constants used in said web position determination algorithms, means for designating that the web/reel assembly loaded in the apparatus has a web of one known length or of another known length, and deriving from said memory means the set of constants corresponding to a designated assembly, computer circuit means determining the successive positions relative to one end of the web of succcessive portions of the web as said portions are transferred from one reel to the other, using said web position determination algorithms with the set of constants from said memory means corresponding to the designated web/reel assembly and the rotational speed ratio of said reels measured as said portions are transferred, said computer circuit means including means producing output signals representing the position determined for each successive web portion, and a display unit connected to said circuit means and displaying the successive positions represented by said output signals to reflect the continuous changes in position of the web as it is transferred from reel to reel.

29. Transport apparatus according to claim 28 wherein said web/reel assemblies comprise known types of cassettes having different known lengths of tape.

30. Transport apparatus according to claim 28 wherein said registers of said measuring means comprise shift registers for each reel accumulating pulses from respective pulse generating means, and the ratios of rotational speeds of said reels is determined by comparing the accumulated counts in said shift registers.

31. In a tape transport apparatus for tape/reel [assemblies] *cassettes* having two reels, said apparatus having drive means for the tape controllable to vary the speed of tape movement, and reel speed detectors, the combination comprising:

a controller connected to said reel speed detectors and said tape drive means,

*circuit means providing, for a known type of cassette, signals representing a set of corresponding constants uniquely characterizing said type of cassette,* means provided by said controller for measuring at successive intervals the ratio of speeds of the reels provided by said detectors, and determining successive tape positions as the tape is moved from reel to reel at various speeds, based on the ratio of reel speeds measured at said intervals, *and said signals derived from said circuit means,* manually operable numberic data input means for entering a target tape position predetermined by the operator into said controller, manually operable means including a search switch activating said controller to control said drive means to carry out a search sequence of tape movement, including engaging said drive means to move said tape toward a target tape position at a first speed, and means provided by said controller for comparing successive determined tape positions with a predetermined target position as the tape moves toward said target position, said controller being operative in said search sequence to control said drive means responsive to said comparing means and shift said drive means from said first to a slower speed upon movement of the tape to a determined tape position spaced a known distance ahead of said predetermined target position, and to stop the tape upon movement of the tape said known distance to the predetermined target position.

* * * * *